(12) United States Patent
Mishra et al.

(10) Patent No.: US 11,671,270 B2
(45) Date of Patent: Jun. 6, 2023

(54) LOGICAL FLOW AGGREGATION FOR FRAGMENTED MULTICAST FLOWS

(71) Applicant: Cisco Technology, Inc., San Jose, CA (US)

(72) Inventors: Mankamana Prasad Mishra, San Jose, CA (US); Roshan Lal, San Jose, CA (US); Anuj Budhiraja, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 46 days.

(21) Appl. No.: 17/307,264

(22) Filed: May 4, 2021

(65) Prior Publication Data
US 2022/0360462 A1    Nov. 10, 2022

(51) Int. Cl.
*H04L 12/18* (2006.01)
*H04L 45/00* (2022.01)
*H04L 45/16* (2022.01)
*H04L 65/611* (2022.01)

(52) U.S. Cl.
CPC .............. *H04L 12/18* (2013.01); *H04L 45/00* (2013.01); *H04L 45/16* (2013.01); *H04L 65/611* (2022.05)

(58) Field of Classification Search
CPC ......... H04L 45/16; H04L 45/24; H04L 45/38; H04L 45/00; H04L 45/30; H04L 45/34; H04L 65/611; H04L 65/762; H04L 65/75; H04L 49/201; H04L 49/602; H04L 47/10; H04L 47/2441; H04L 47/33; H04L 43/16; H04L 43/026; H04L 43/062; H04L 43/0888; H04L 12/00; H04L 12/56; H04L 2012/4629; H04L 2012/6416; H04L 41/0896; H04L 12/18
See application file for complete search history.

(56) References Cited

U.S. PATENT DOCUMENTS

| | | | |
|---|---|---|---|
| 6,791,980 B1 | 9/2004 | Li | |
| 10,057,080 B2 * | 8/2018 | Evans | .................. H04L 47/6225 |
| 2010/0043067 A1 * | 2/2010 | Varadhan | ................. H04L 12/18 |
| | | | 726/13 |
| 2011/0085546 A1 | 4/2011 | Capello et al. | |
| 2011/0211578 A1 | 9/2011 | Zwiebel et al. | |
| 2014/0376366 A1 | 12/2014 | Li et al. | |
| 2016/0014469 A1 * | 1/2016 | Serbest | ............... H04L 12/1868 |
| | | | 370/390 |
| 2019/0007225 A1 * | 1/2019 | Nagarajan | ........... H04L 41/0213 |
| 2020/0077161 A1 | 3/2020 | Lohmar et al. | |

* cited by examiner

*Primary Examiner* — Mohamed A. Wasel
*Assistant Examiner* — Rachel J Hackenberg
(74) *Attorney, Agent, or Firm* — Baker Botts L.L.P.

(57) ABSTRACT

The present disclosure is directed to systems and methods for logical flow aggregation for fragmented multicast flows, the methods including the steps of identifying a plurality of fragmented multicast flows that are logically related as a single flow in a multicast network; generating a plurality of multicast joins associated with the plurality of fragmented multicast flows, wherein each multicast join of the plurality of multicast joins includes a join attribute comprising a common flow identifier that identifies the plurality of fragmented multicast flows as logically related; and selecting a reverse forwarding path toward an upstream device for the plurality of multicast joins.

20 Claims, 3 Drawing Sheets

LOGICAL FLOW AGGREGATION FOR FRAGMENTED MULTICAST FLOWS

TECHNICAL FIELD

The present disclosure generally relates to multicast flows, and more specifically to systems and methods for logical flow aggregation for fragmented multicast flows.

BACKGROUND

IP multicast is a bandwidth-conserving technology that reduces traffic by simultaneously delivering a single stream of information to potentially thousands of corporate recipients and homes (e.g., receivers). Multicast packets are replicated in the network at the point where paths diverge by edge devices enabled with Protocol Independent Multicast (PIM) and/or other supporting multicast protocols, resulting in efficient delivery of data to multiple receivers.

DESCRIPTION OF EXAMPLE EMBODIMENTS

Overview

Figure 1:
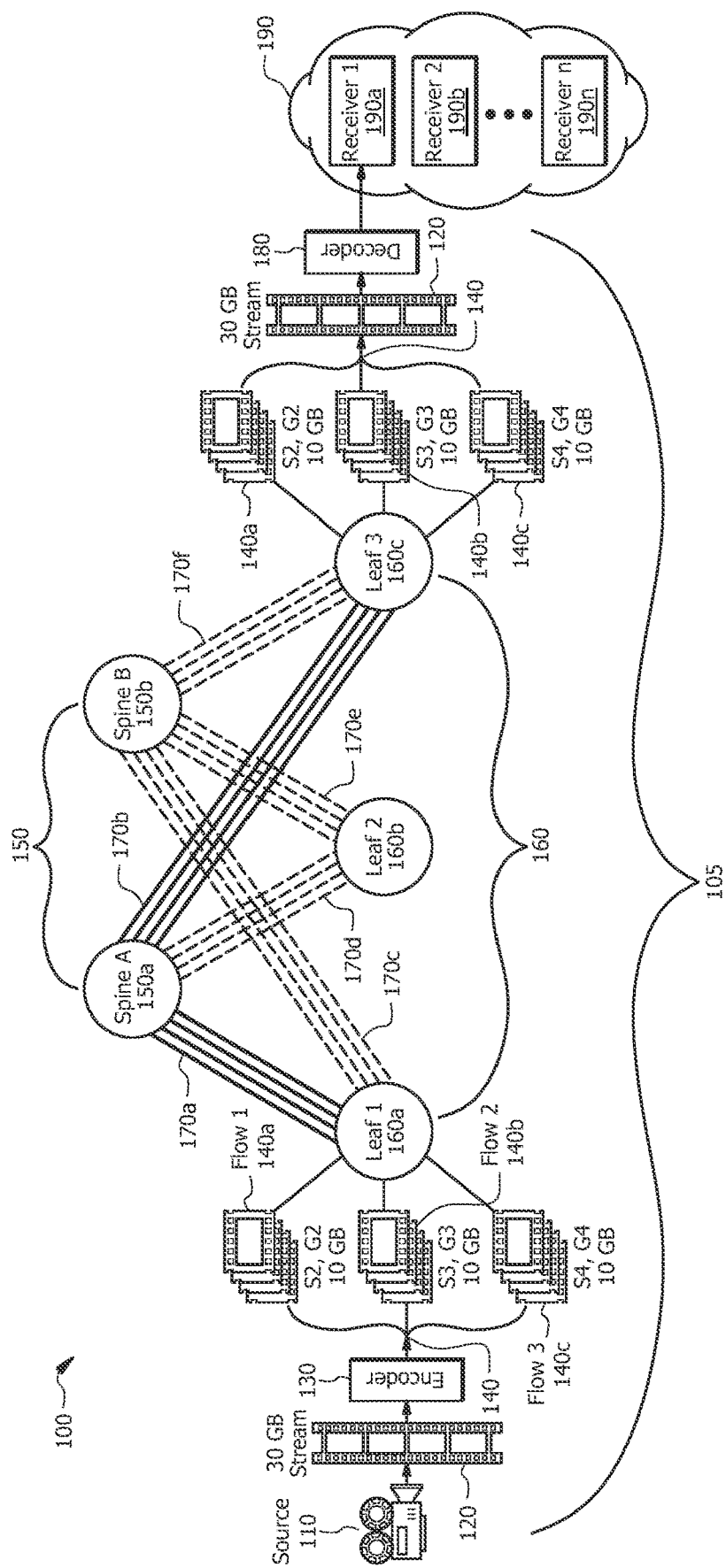
FIG. 1 illustrates a system for logical flow aggregation for fragmented multicast flows, in accordance with certain embodiments.

According to an embodiment, a system may include one or more processors and one or more computer-readable non-transitory storage media comprising instructions that, when executed by the one or more processors, cause one or more components of the system to perform operations including, identifying a plurality of fragmented multicast flows that are logically related as a single flow in a multicast network; generating a plurality of multicast joins associated with the plurality of fragmented multicast flows, wherein each multicast join of the plurality of multicast joins includes a join attribute comprising a common flow identifier that identifies the plurality of fragmented multicast flows as logically related; and selecting a reverse forwarding path toward an upstream device for the plurality of multicast joins.

Additionally, the plurality of multicast joins may be based on Protocol-Independent Multicast (PIM) routing protocols. Further, the common flow identifier may be unique in a PIM domain.

Moreover, the common flow identifier may remain with each of the plurality of multicast joins traveling to respective upstream devices in the multicast network. Also, the common flow identifier may indicate to the respective upstream devices that the plurality of fragmented multicast flows are logically related.

Additionally, the operations may further include sending the plurality of multicast joins to the upstream device via the selected reverse forwarding path based on bandwidth availability sufficient to transmit the plurality of fragmented multicast flows via the upstream device.

The operations may also include terminating the plurality of multicast joins if available bandwidth from the upstream device is insufficient to transmit the plurality of fragmented multicast flows.

According to another embodiment, a method may include the steps of identifying a plurality of fragmented multicast flows that are logically related as a single flow in a multicast network; generating a plurality of multicast joins associated with the plurality of fragmented multicast flows, wherein each multicast join of the plurality of multicast joins includes a join attribute comprising a common flow identifier that identifies the plurality of fragmented multicast flows as logically related; and selecting a reverse forwarding path toward an upstream device for the plurality of multicast joins.

According to yet another embodiment, one or more computer-readable non-transitory storage media may embody instructions that, when executed by a processor, cause the performance of operations, including identifying a plurality of fragmented multicast flows that are logically related as a single flow in a multicast network; generating a plurality of multicast joins associated with the plurality of fragmented multicast flows, wherein each multicast join of the plurality of multicast joins includes a join attribute comprising a common flow identifier that identifies the plurality of fragmented multicast flows as logically related; and selecting a reverse forwarding path toward an upstream device for the plurality of multicast joins.

Technical advantages of certain embodiments of this disclosure may include one or more of the following. The systems and methods described herein may allow for the correlation of a plurality of fragmented data streams or multicast flows as belonging to a logically single flow, so that the fragmented flows may be directed to traverse the same path in a multicast network, thereby avoiding transmission discrepancies among the various fragmented flows. More specifically, the mechanisms of the present disclosure may enhance the join attributes in multicast, so that, upstream devices are notified that a set of fragmented flows are logically single and belong to the same reverse forwarding path. The present disclosure also includes mechanisms that handle join procedures at each upstream hop.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

IP multicast allows for the delivery of application source traffic (i.e., a data stream or flow comprising a series of packets) to multiple receivers over an IP infrastructure in a multicast network. The set of receivers that are interested in receiving a particular data stream, collectively referred to as the multicast "group," indicate their interest by sending an Internet Group Management Protocol (IGMP) host report to routers in the network. The routers then use a multicast protocol to dynamically create a multicast distribution tree between the source and the interested receivers, wherein a router replicates a multicast packet when the packet reaches a divergence of paths. The data stream will then be delivered only to the network segments that are in the path between the source and the interested receivers. Since the source sends packets only once and the packets are replicated at divergent points in the network, the result is an efficient delivery of data to multiple receivers.

One application of IP multicast is video streaming, i.e., the sending of video streams (including raw video feed) from a multicast source to a multicast group. With the advancement of technology, video quality has improved and video content is now provided in higher resolution in 4K or 8K. Higher video resolutions inherently translate to larger video files. For example, a raw video stream of 4K resolution may be 750 GB in size; when the resolution of the video stream is enhanced to 8K, the stream may be 7 TB in size. While customers desire enhanced video resolution, networks may be unable to offer corresponding bandwidth to transmit the high resolution video as a single stream. Since video streams are comprised of a series of frames, a large video stream may be split into a plurality of smaller streams by an encoder at the source side. For example, a single 100 GB video stream may be split into four smaller 25 GB streams. These smaller streams may then be transmitted through different physical interfaces in the network in accordance with multicast routing protocols known in the art. Then, on the receiving side, a decoder may merge and order the received smaller streams to derive the original full-length video stream.

Because today's networks are quite large, and include a large number of nodes and paths (with the nodes recognizing and processing every data stream as independent of other data streams), each of these smaller streams may traverse from a source to a receiver via separate paths and through different nodes in the network. And because nodes possess different capabilities and capacities, each of the smaller streams will likely exhibit varying mean transmit times (with some streams potentially delayed more than others, based on the traffic, capacity, etc. throughout the network), thereby requiring the receiver/decoder to implement buffering schemes and other mechanisms to successfully merge the streams.

The present disclosure is directed to a mechanism that correlates a plurality of fragmented data streams or multicast flows as belonging to a logically single (larger) flow, so that the fragmented flows may be directed to traverse the same path in a multicast network, thereby avoiding transmission discrepancies among the various fragmented flows. In other words, because fragmented multicast flows belonging to a logically single flow are directed along the same path, all of the fragmented flows would experience the same delays and arrive at a receiver/decoder around the same time. More specifically, the mechanisms of the present disclosure are directed to enhancing the join attributes in multicast, so that, in forming the multicast distribution tree, upstream neighbors are notified that a set of fragmented flows are logically single and belong to the same reverse forwarding path. The present disclosure also includes mechanisms that handle join procedures at each upstream hop.

Reference is now made to FIG. 1, wherein is depicted a system 100 for logical flow aggregation for fragmented multicast flows, in accordance with the present disclosure. System 100 may comprise a multicast network 105 that includes at least one multicast source 110 and a plurality of multicast receivers 190a-n. The plurality of multicast receivers 190a-n may comprise a multicast group 190, i.e., a set of receivers that request a particular data stream (also referred to as a multicast flow) from the multicast source 110. For purposes of simplicity and to illustrate the specific features of the present disclosure, system 100 of FIG. 1 will be described in conjunction with a particular receiver, i.e., "Receiver 1" (referred to in the present disclosure as multicast receiver 190a), which sits behind and/or is associated with Leaf 3 160c.

System 100 also includes at least one encoder 130 associated with the multicast source 110. The encoder 130 splits the multicast flow or video stream 120 generated by the multicast source into a plurality of smaller fragmented multicast flows 140. In an embodiment, where the multicast flow comprises video data, the encoder 130 may split the video stream 120 into smaller fragmented multicast flows 140 based on frames. Although the encoder 130 is depicted as a device separate from the multicast source 110, it is to be understood that the encoder 130 may comprise functionality that may be incorporated into the multicast source 110. Similarly, system 100 also includes at least one decoder 180, which merges the fragmented multicast flows 140 back into the original single video stream 120. Although the decoder 180 is depicted separately (i.e., as a separate device) from the multicast receiver 190a, it is to be understood that the decoder 180 may comprise functionality that is incorporated into the multicast receiver 190a.

System 100 further includes a plurality of "spines" and "leaves" through which multicast flows traverse the network 105. In the two-tier architecture shown in FIG. 1, every lower-tier router or switch (leaf layer 160) is connected to each of the top-tier routers or switches (spine layer 150) in a full-mesh topology. The leaf layer 160 consists of access switches (e.g., edge devices) that connect to devices such as servers. The spine layer 150, consisting, e.g., of core routers and switches, is the backbone of the network and is responsible for interconnecting all leaf switches. Every leaf switch connects to every spine switch in the fabric. In conventional multicast, the path is randomly chosen so that the traffic load is evenly distributed among the top-tier switches. For purposes of illustration, two spines (Spine A 150a and Spine B 150b) and three leaves (Leaf 1 160a, Leaf 2 160b, and Leaf 3 160c) are shown in network 105.

Moreover, for purposes of illustration and not by way of limitation, FIG. 1 shows a topology in which there are four links available between each leaf and spine in the multicast network 105. By way of example, four links (collectively referred to as links 170a) are available between Leaf 1 160a and Spine A 150a; four links (collectively referred to as links 170b) are available between Spine A 150a and Leaf 3 160c. Likewise, four links are available between each of the other leaves and spines (collectively referred to as links 170c, 170d, 170e, and 170f). Each link has a bandwidth capacity of 40 GB. In the scenario depicted in FIG. 1, suppose the links between Leaf 1 160a and Spine A 150a are fully available (i.e., all 40 GB available to use on each link). Additionally, suppose the links between Spine A 150a and Leaf 3 160c are only partially available, i.e., 30 GB are in use on each link, leaving 10 GB of available bandwidth per link. Finally, suppose there is no bandwidth availability in the remaining sets of links, i.e., from Leaf 1 160a to Spine B 150b, from Spine B 150b to Leaf 3 160c, from Spine A 150a to Leaf 2 160b, and from Leaf 2 160b to Spine B 150b.

In operation, the multicast source 110 may create a multicast flow, e.g., video stream 120, for transmission to any of a plurality of receivers in the multicast network. While the data generated by the multicast source 110 is referred to as a "video stream," it is to be understood that the term is not intended to be limiting and may comprise any type of flow, stream, or traffic transmissible from the multicast source 110 to a multicast receiver 190a. A multicast receiver 190a (among other receivers in a multicast group 190), sitting behind Leaf 3 160c, may express interest in the video stream 120, in accordance with mechanisms known in the art. Suppose the video stream 120 generated by the multicast source 110 is 30 GB in size. Based on bandwidth availability between the multicast source 110 and the multicast receiver 190a (with no single link from Leaf 3 160c having 30 GB of available bandwidth), the encoder 130 fragments the video stream 120 into three smaller multicast flows of 10 GB each. The three fragmented multicast flows are labeled as: Flow 1 140a (S2, G2), Flow 2 140b (S3, G3), and Flow 3 140c (S4, G4) (with "S" and "G" referring to the "source" and "group" in accordance with multicast terminology). The three flows are collectively referred to as a plurality of fragmented multicast flows 140. The present disclosure assumes that the network operator/administrator knows in advance that the plurality of fragmented multicast flows 140 are a logically single flow, and due to network fabric bandwidth, they have been fragmented into three fragmented multicast flows 140a-c. The present disclosure further assumes that there is bandwidth available in the network 105 to achieve end-to-end multicast flow.

With continued reference to FIG. 1, the multicast receiver 190a behind Leaf 3 160c is aware that the plurality of fragmented multicast flows 140 corresponds to the video stream 120 in which it has expressed interest (in accordance with multicast mechanisms known in the art, e.g., by a controller or other overlay technologies) and sends a membership request to Leaf 3 160c for each of the fragmented multicast flows. In receiving the membership requests, Leaf 3 160c then identifies the plurality of fragmented multicast flows are logically related as a single flow. In an embodiment, Leaf 3 160c may "identify" the plurality of fragmented multicast flows are logically related as a single flow based on, e.g., pre-configurations, content in the membership requests, information advertised by a controller or other overlay technologies, etc.

Next, Leaf 3 160c generates a plurality of multicast joins (in this case, three multicast joins), each multicast join associated with each of the fragmented multicast flows. In an embodiment the multicast joins comprise PIM joins based on PIM routing protocols, as known and described, for example, in IETF's Network Working Group RFC 4384. Although the present disclosure describes PIM joins generated through PIM protocols, it is to be understood that the present disclosure is not to be so limited and may operate under any multicast protocol having its own corresponding join mechanisms.

In accordance with the present disclosure, each multicast join of the plurality of multicast joins includes a join attribute comprising a common flow identifier that identifies the plurality of multicast flows as logically related, i.e., as belonging to a single logical flow. The flow identifier may be a numeric or alphanumeric code that is incorporated into the multicast join. The flow identifier comprises a unique identifier in the PIM or other multicast domain; otherwise, intermediate/upstream routers would not be able to correlated related flows and/or differentiate between flows. Additionally, the flow identifier is the same or common among the plurality of multicast joins to ensure that the plurality of fragmented multicast flows 140 are identified as a logically single flow. The flow identifier is also configurable to remain with each of the plurality of multicast joins as they travel to respective upstream devices in the multicast network 105. This ensures that every node traversed by the plurality of multicast joins knows that the associated plurality of fragmented multicast flows 140 are logically singular. In an embodiment, the flow identifier may be statically configured. In another embodiment, a hash mechanism may be used to generate a flow identifier based on one or more hash algorithms.

Next, Leaf 3 160c selects a single reverse forwarding path (also referred to in the art as a reverse path forwarding (RPF)) for the plurality of multicast joins toward an upstream device. The reverse forwarding path corresponds to the path to be traversed by the plurality of fragmented multicast flows 140 as they travel from the multicast source 110 to the multicast receiver 190a. In the example of FIG. 1, Leaf 3 160c selects Spine A 150a based on its bandwidth availability. It is to be understood that Leaf 3 160c may choose any reverse forwarding path having capacity to transmit the plurality of fragmented multicast flows, but importantly, in accordance with the present disclosure, the same path is selected for all of the fragmented multicast flows that are logically part of the same larger flow.

Then, Leaf 3 160c sends the plurality of multicast joins to the upstream device via the selected reverse forwarding path based on bandwidth availability sufficient to transmit the plurality of fragmented multicast flows 140 via the upstream device. In other words, if the bandwidth capacity of the links from Spine A 150a to Leaf 3 160c is deemed sufficient to transmit the plurality of fragmented multicast flows 140, then Leaf 3 160c will send the plurality of multicast joins upstream to Spine A 150.

When the plurality of multicast joins reaches the next-hop upstream device (here, Spine A 150a), the upstream device recognizes and processes the plurality of multicast joins as associated with a logically single flow due to the common flow identifier in the join attribute of the plurality of multicast joins. Then, when the upstream device sends its own plurality of multicast joins upstream for the plurality of fragmented multicast flows 140, it will select a single reverse forwarding path (or RPF) for the plurality of multicast joins toward the next upstream device (here, Leaf 1 160a). Additionally, when sending its multicast joins upstream, the upstream node will maintain and include the same flow identifier in the join attribute for each multicast join of the plurality of multicast joins for the logically singular plurality of fragmented multicast flows 140.

In this manner, by configuration, each upstream node will identify multicast joins having a common flow identifier, recognize and process the multicast joins as associated with a logically singular flow, select the same reverse forwarding path for these multicast joins, and send the multicast joins with the common flow identifier to the next appropriate upstream device. In this manner, the last hop upstream device, which in the example of FIG. 1 is Leaf 1 160a, receives the plurality of multicast joins, with each multicast join having the common flow identifier. Once the multicast distribution tree has been established, in accordance with multicast protocols, the plurality of fragmented multicast flows 140 will be transmitted together from Leaf 1 160a to Spine A 150a to Leaf 3 160c, before being merged back together as a single video stream 120 by the decoder 180 and provided to the multicast receiver 190a requesting the video stream 120.

It may be the case, in certain instances, that bandwidth availability from a given upstream device may be insufficient to transmit the plurality of multicast flows. In such cases, the present disclosure contemplates at least two configurable possibilities, referred to herein as "strict RPF" and "loose RPF" configurations. In a strict RPF configuration, a network administrator may ensure that all fragmented multicast flows traverse the same path in the multicast network. In this case, if an upstream device determines there is insufficient bandwidth for even one fragmented multicast flow of the plurality of multicast flows having the same flow identifier, the upstream device does not process any of the multicast joins associated with the plurality of fragmented multicast flows. In other words, in strict RPF, if an upstream device cannot process all of the plurality of fragmented multicast flows having the same flow identifier, it will not process any of the fragmented multicast flows. In some implementations, e.g., where negative acknowledgement messages are employed, the upstream device may notify the downstream device of the processing failure.

In a loose RPF configuration, the network administrator may not want to employ such stringent next hop constraints. In this case, an upstream device may attempt to select the same forwarding path for as many of the plurality of fragmented multicast flows having the same flow identifier as the available bandwidth may allow. All remaining fragmented multicast flows may be directed to a different forwarding path.

In another embodiment, the mechanisms described in the present disclosure may further be applied in the context of multi-homing, and specifically in the context of self-controlled customer edge devices where peers synchronize their multicast traffic with each other. In case of multi-homing, a switch is conventionally multi-hopped to two leaves. However, an encoder may be added behind the switch, the encoder responsible to create the plurality of fragmented multicast flows from a logically single flow/stream. While the switch is unaware that the plurality of fragmented multicast flows are part of the same logical flow, the switch can be configured to determine where to send flows based on certain hashing parameters, including a User Datagram Protocol (UDP) port. When the encoder creates the plurality of fragmented multicast flows from a logically single flow, it may code the plurality of fragmented multicast flows with the same UDP port. Thus, when traffic arrives at the switch, because the plurality of flows are based on the same UDP port, the switch will direct the flows toward the same path.

Figure 2:
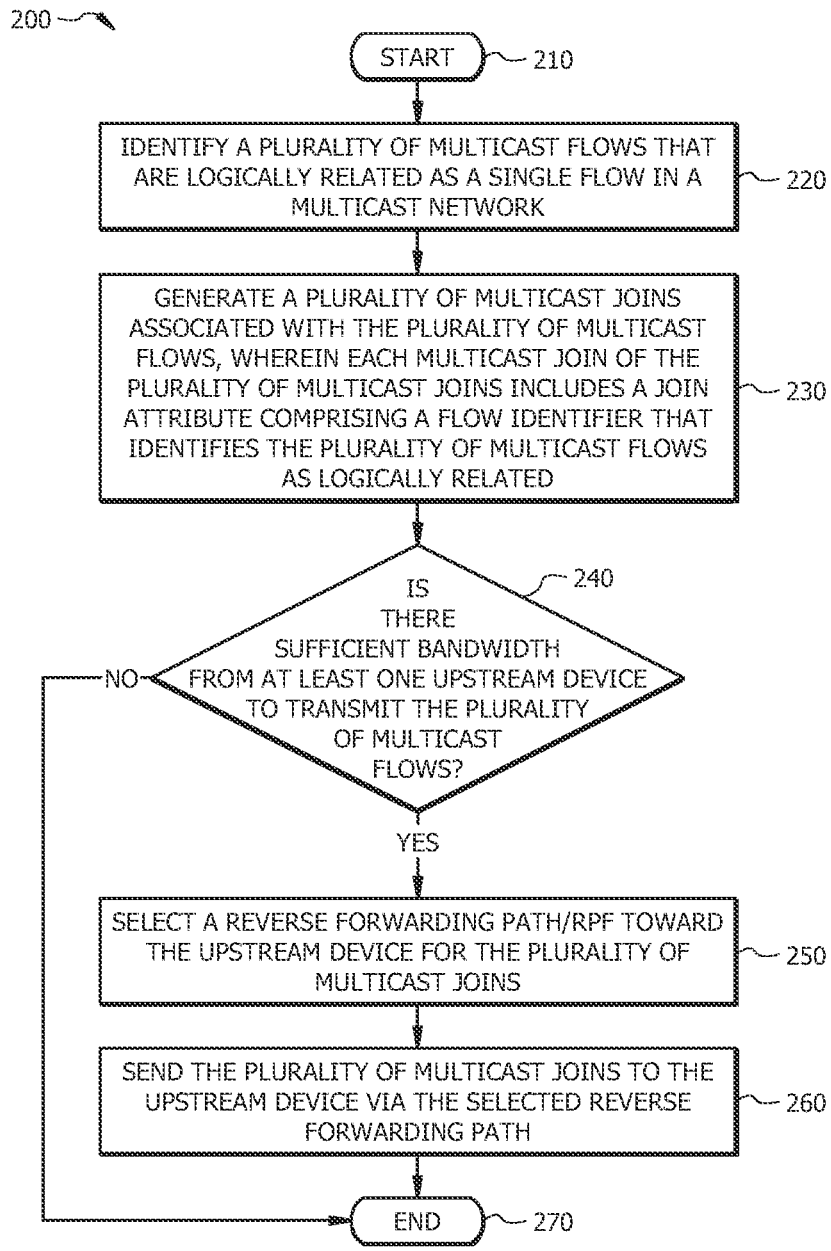
FIG. 2 illustrates a flow diagram of a method for logical flow aggregation for fragmented multicast flows, in accordance with certain embodiments.

Reference is now made to FIG. 2, wherein is shown a flow diagram of a method 200 for logical flow aggregation for fragmented multicast flows, in accordance with the present disclosure. The steps of method 200 may be in accord with the operations outlined in conjunction with the system 100 of FIG. 1. As such, similar and corresponding terms described in conjunction with FIG. 1 may have the same meaning when used in conjunction with the method 200 of FIG. 2. Additionally, the present disclosure incorporates by reference the description of FIG. 1 for the purposes of explaining, expounding upon, or otherwise clarifying the steps of method 200.

Method 200 may be performed in a multicast network having a multicast source, at least one multicast receiver, and a plurality of leaves and spines through which data streams (also referred to as multicast flows) traverse the network from the multicast source to the at least one multicast receiver. "Spines" and "leaves" may comprise, in one instance, core and edge routers, respectively, through which multicast flows traverse the network. In an embodiment, method 200 presumes that the multicast source generates a multicast flow, such as a video stream, for transmission to a plurality of multicast receivers in the multicast network. In particular, a multicast receiver (among other receivers in a multicast group), sitting behind a given leaf, expresses interest in the video stream, in accordance with mechanisms known in the art. Based on bandwidth limitations between the multicast source and the multicast receiver, an encoder at the source side fragments the multicast flow into a plurality of fragmented multicast flows. Once fragmented, it is presumed that each of the plurality of fragmented multicast flows may now traverse the network via leaves and spines using available bandwidth. Method 200 further presumes that the multicast receiver sitting behind its associated leaf is aware that the plurality of fragmented multicast flows corresponds to the video stream in which it has expressed interest and sends a membership request to the leaf for each of the plurality of fragmented multicast flows. Method 200 also presumes that the network operator/administrator knows in advance that the plurality of fragmented multicast flows are logically a single flow, and due to network fabric bandwidth, they have been fragmented into a plurality of fragmented multicast flows. The present disclosure further assumes that there is bandwidth available in the network to achieve end-to-end multicast flow.

In an embodiment, the steps of method 200 may be performed from the perspective of a leaf (or edge device) associated with a multicast receiver desiring the multicast flow (or the plurality of fragmented multicast flows). However, it is to be understood that method 200 may be performed by any component, element, or module in the applicable multicast network, without departing from the spirit or scope of the present disclosure.

The method may begin at step 210. At step 220, the leaf or edge device (hereinafter referred to as "the leaf"), which is associated with the multicast receiver desiring the multicast flow, identifies the plurality of fragmented multicast flows that are logically related as a single flow in the multicast network. In an embodiment, the leaf may "identify" the plurality of fragmented multicast flows are logically related as a single flow based on, e.g., e.g., system pre-configurations, content of the membership requests received from the multicast receiver, information advertised by a controller or other overlay technologies, etc.

At step 230, the leaf generates a plurality of multicast joins associated with the plurality of fragmented multicast flows, i.e., each multicast join of the plurality of multicast joins associated with a fragmented multicast flow of the plurality of fragmented multicast flows. In an embodiment the plurality of multicast joins comprises PIM joins based on PIM routing protocols, as known and described, e.g., in IETF's Network Working Group RFC 4384. Although the present disclosure describes PIM joins generated through PIM protocols, it is to be understood that the present disclosure is not to be so limited and may operate under any multicast protocol having its own corresponding join mechanisms.

Moreover, each multicast join of the plurality of multicast joins includes a join attribute comprising a common flow identifier that identifies the plurality of fragmented multicast flows as logically related, i.e., as belonging to a single logical flow. The flow identifier may be a numeric or alphanumeric code that is incorporated into the multicast join. The flow identifier may comprise a unique identifier in the PIM or other multicast domain so that intermediate/upstream routers may correlate related flows and/or differentiate between flows. Additionally, the flow identifier may be the same or common among the plurality of multicast joins to ensure that the plurality of fragmented multicast flows are identified as a logically single flow. The flow identifier is also configurable to remain with each of the plurality of multicast joins as they travel to respective upstream devices in the multicast network. This may ensure that every node traversed by the plurality of multicast joins knows that the associated fragmented multicast flows are logically singular. In an embodiment, the flow identifier may be statically configured. In another embodiment, a hash mechanism may be used to generate a flow identifier based on various hash algorithms known in the art.

At step 240, a determination is made as to whether there is sufficient bandwidth between the leaf and at least one upstream device to transmit the plurality of fragmented multicast flows together. If, at step 240, it is determined that there is not sufficient bandwidth between the leaf and at least one upstream device to transmit the plurality of fragmented multicast flows, the method may end at step 270. If, however, at step 240, it is determined that there is sufficient bandwidth between the leaf and at least one upstream device to transmit the plurality of fragmented multicast flows together, the method may proceed to step 250.

At step 250, the leaf selects a single reverse forwarding path (also referred to as a reverse path forwarding (RPF)) for the plurality of multicast joins toward an upstream device. The reverse forwarding path corresponds to the path to be traversed by the plurality of fragmented multicast flows as they travel from the multicast source to the multicast receiver. It is to be understood that the leaf may choose any reverse forwarding path having capacity to transmit the plurality of fragmented multicast flows, but importantly, in accordance with the present disclosure, the same path is selected for all of the fragmented multicast flows that are logically part of the same larger flow.

At step 260, the leaf sends the plurality of multicast joins to the upstream device via the selected reverse forwarding path based on bandwidth availability sufficient to transmit the plurality of multicast flows via the upstream device. When the plurality of multicast joins reaches the next-hop upstream device, the upstream device recognizes and processes the plurality of multicast joins as associated with a logically single flow due to the common flow identifier in the join attribute of the plurality of multicast joins. Then, when the upstream device sends its own plurality of multicast joins upstream for the plurality of fragmented multicast flows, it will select a single reverse forwarding path (or RPF) for the plurality of multicast joins toward the next upstream device. Additionally, when sending its multicast joins upstream, the upstream node will maintain and include the same flow identifier in the join attribute for each multicast join of the plurality of multicast joins for the logically singular plurality of fragmented multicast flows.

In an embodiment, the plurality of multicast joins may be terminated if available bandwidth from the upstream device is insufficient to transmit the plurality of fragmented multicast flows. In other words, if an upstream device cannot process all of the plurality of fragmented multicast flows having the same flow identifier, it will not process any of the fragmented multicast flows. In some implementations, e.g., where negative acknowledgement messages are employed, the upstream device may notify the downstream device of the processing failure.

In another embodiment, an upstream device may attempt to select the same forwarding path for as many of the plurality of fragmented multicast flows having the same flow identifier as the available bandwidth may allow. All remaining fragmented multicast flows may be directed to a different forwarding path.

Thus, in the manner described above, by configuration, each upstream node will identify multicast joins having a common flow identifier, recognize and process the multicast joins as associated with a logically singular flow, select the same reverse forwarding path for these multicast joins, and send the multicast joins with the common flow identifier to the next appropriate upstream device. In this manner, the last hop upstream device receives the plurality of multicast joins, with each multicast join having the common flow identifier. Once the multicast distribution tree has been established, in accordance with multicast protocols, the plurality of fragmented multicast flows will be transmitted along the selected path, before being merged back together as a single video stream by the decoder and provided to the multicast receiver requesting the video stream.

At step 270, the method 200 may end.

In sum, the systems and methods of the present disclosure may allow for a simple join attribute extension (whether in the PIM or other domain) that allows for the logical grouping of multicast flows. In accordance with the present disclosure, and as described above, the systems and methods described herein resolve any issues with transmission delays or variances occurring between logically singular flows, thereby allowing for a deterministic and robust merging of fragmented multicast flows.

Figure 3:
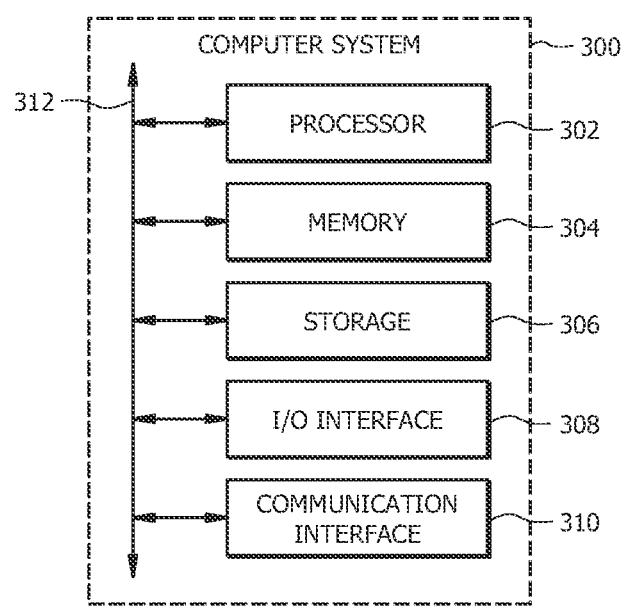
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors;
one or more computer-readable non-transitory storage media comprising instructions that, when executed by the one or more processors, cause one or more components of the system to perform operations comprising:
splitting a multicast flow in a multicast network into a plurality of fragmented multicast flows, wherein each of the plurality of fragmented multicast flows are smaller than the multicast flow;
identifying the plurality of fragmented multicast flows as being logically related as a single flow in the multicast network;
generating a plurality of multicast joins associated with the plurality of fragmented multicast flows, wherein each multicast join of the plurality of multicast joins includes a join attribute comprising a common flow identifier that identifies the plurality of fragmented multicast flows as logically related;
selecting a reverse forwarding path toward an upstream device for the plurality of multicast joins;
merging the plurality of the fragmented multicast flows into the multicast flow; and communicating the multicast flow to the upstream device.

2. The system of claim 1, wherein the plurality of multicast joins is based on Protocol-Independent Multicast (PIM) routing protocols.

3. The system of claim 2, wherein the common flow identifier is unique in a PIM domain.

4. The system of claim 1, wherein the common flow identifier remains with each of the plurality of multicast joins traveling to the upstream device in the multicast network.

5. The system of claim 4, wherein the common flow identifier indicates to the respective upstream devices that the plurality of fragmented multicast flows are logically related.

6. The system of claim 1, further comprising the operation of:
sending the plurality of multicast joins to the upstream device via the selected reverse forwarding path based on bandwidth availability sufficient to transmit the plurality of fragmented multicast flows via the upstream device.

7. The system of claim 1, further comprising the operation of:
terminating the plurality of multicast joins if available bandwidth from the upstream device is insufficient to transmit the plurality of fragmented multicast flows.

8. A method, comprising:
splitting a multicast flow in a multicast network into a plurality of fragmented multicast flows, wherein each of the plurality of fragment multicast flows are smaller than the multicast flow;
identifying the plurality of fragmented multicast flows as being related as a single flow in the multicast network;
generating a plurality of multicast joins associated with the plurality of fragmented multicast flows, wherein each multicast join of the plurality of multicast joins includes a join attribute comprising a common flow identifier that identifies the plurality of fragmented multicast flows as logically related;
selecting a reverse forwarding path toward an upstream device for the plurality of multicast joins;
merging the plurality of the fragmented multicast flows into the multicast flow; and
communicating the multicast flow to the upstream device.

9. The method of claim 8, wherein the plurality of multicast joins is based on Protocol-Independent Multicast (PIM) routing protocols.

10. The method of claim 9, wherein the common flow identifier is unique in a PIM domain.

11. The method of claim 8, wherein the common flow identifier remains with each of the plurality of multicast joins traveling to the upstream device in the multicast network.

12. The method of claim 11, wherein the common flow identifier indicates to the respective upstream devices that the plurality of fragmented multicast flows are logically related.

13. The method of claim 8, further comprising the step of:
sending the plurality of multicast joins to the upstream device via the selected reverse forwarding path based on bandwidth availability sufficient to transmit the plurality of fragmented multicast flows via the upstream device.

14. The method of claim 8, further comprising the step of:
terminating the plurality of multicast joins if available bandwidth from the upstream device is insufficient to transmit the plurality of fragmented multicast flows.

15. One or more computer-readable non-transitory storage media embodying instructions that, when executed by a processor, cause the performance of operations comprising:
splitting a multicast flow in a multicast network into a plurality of fragmented multicast flows, wherein each of the plurality of fragment multicast flows are smaller than the multicast flow;
identifying the plurality of fragmented multicast flows that are logically related as a single flow in a multicast network;
generating a plurality of multicast joins associated with the plurality of fragmented multicast flows, wherein each multicast join of the plurality of multicast joins includes a join attribute comprising a common flow identifier that identifies the plurality of fragmented multicast flows as logically related;
selecting a reverse forwarding path toward an upstream device for the plurality of multicast joins;
merging the plurality of the fragmented multicast flows into the multicast flow; and
communicating the multicast flow to the upstream device.

16. The one or more computer-readable non-transitory storage media of claim 15, wherein the plurality of multicast joins is based on Protocol-Independent Multicast (PIM) routing protocols.

17. The one or more computer-readable non-transitory storage media of claim 16, wherein the common flow identifier is unique in a PIM domain.

18. The one or more computer-readable non-transitory storage media of claim 15, wherein the common flow identifier remains with each of the plurality of multicast joins traveling to the upstream device in the multicast network.

19. The one or more computer-readable non-transitory storage media of claim 18, wherein the common flow identifier indicates to the respective upstream devices that the plurality of fragmented multicast flows are logically related.

20. The one or more computer-readable non-transitory storage media of claim 15, further comprising the operation of:
sending the plurality of multicast joins to the upstream device via the selected reverse forwarding path based on bandwidth availability sufficient to transmit the plurality of fragmented multicast flows via the upstream device.

* * * * *